United States Patent [19]

Lett et al.

[11] Patent Number: 5,592,551

[45] Date of Patent: Jan. 7, 1997

[54] METHOD AND APPARATUS FOR PROVIDING INTERACTIVE ELECTRONIC PROGRAMMING GUIDE

[75] Inventors: David B. Lett, Duluth; William M. Raley, Jr., Lawrenceville, both of Ga.; Michael T. Hayashi, Aurora, Colo.

[73] Assignee: Scientific-Atlanta, Inc., Norcross, Ga.

[21] Appl. No.: 230,144

[22] Filed: Apr. 19, 1994

Related U.S. Application Data

[63] Continuation-in-part of Ser. No. 983,910, Dec. 2, 1992, Pat. No. 5,367,571, Ser. No. 983,909, Dec. 11, 1992, abandoned, and Ser. No. 984,038, Dec. 1, 1992, Pat. No. 5,357,276.

[51] Int. Cl.⁶ .............................. H04N 7/00; H04N 7/10; H04N 7/167
[52] U.S. Cl. ........................ 380/20; 348/3; 348/7; 348/12; 348/13; 348/906
[58] Field of Search ........................ 380/20; 348/12, 348/3, 13, 7, 17, 906; 455/2, 5.1, 4.2

[56] References Cited

U.S. PATENT DOCUMENTS

| | | | |
|---|---|---|---|
| 4,388,645 | 6/1983 | Cox et al. | 358/147 |
| 4,439,784 | 3/1984 | Furukawa et al. | 358/86 |
| 4,618,888 | 10/1986 | Nohara et al. | 358/120 |
| 4,706,121 | 11/1987 | Young | 358/142 |
| 4,977,455 | 12/1990 | Young. | |
| 5,038,211 | 8/1991 | Hallenbeck | 358/142 |
| 5,168,353 | 12/1992 | Walker et al. | 358/86 |
| 5,253,066 | 10/1993 | Vogel | 358/188 |
| 5,353,121 | 10/1994 | Young et al. | 348/563 |
| 5,357,276 | 10/1994 | Banker et al. | 348/7 |
| 5,412,720 | 5/1995 | Hoarty | 380/15 |
| 5,479,266 | 12/1995 | Young et al.. | |
| 5,479,268 | 12/1995 | Young et al.. | |

FOREIGN PATENT DOCUMENTS

WO92/04801 3/1992 WIPO.

*Primary Examiner*—Stephen C. Buczinski
*Attorney, Agent, or Firm*—Banner & Allegretti, Ltd.

[57] ABSTRACT

A subscription television system is provided that transmits a plurality of television signals to a plurality of subscribers. The television signals include pay-per-view programs (purchased by feature) or near-video-on-demand programs (purchased for a period of time for unlimited viewing) that are provided only to subscribers that purchase the programs. Data representing an electronic programming guide is also transmitted. The electronic programming guide can be displayed by a subscriber terminal at the subscriber's location. The electronic programming guide is a grid listing television programs by date, time and channel. A subscriber can select programs for watching or recording from the electronic program guide. Moreover, the subscriber can purchase pay-per-view or near-video-on-demand programs from the electronic programming guide.

48 Claims, 15 Drawing Sheets

*FIG. 5*

| 06/11 | 8:00 | 8:30 | 9:00 | 9:30 |
|---|---|---|---|---|
| COMM 02 | LOCAL PROGRAMMING AND INFORMATION | | | |
| WSB 03 | FULL HOUSE | HOME IMPRVMENT | ROSEANNE | DOOGIE HOUSER |
| WAGA 04 | EVENING SHADE | MAJOR DAD | JAKE & THE FATMAN | |
| PPV 05 | TERMINATOR 2 R | | | |
| WATL 06 | A TOWN TORN APART TV | | | |
| WTBS 07 | BEVERLY HILLBILL | ANDY GRIFFITH | ADDAMS FAMILY | SANFORD & SON |

CURRENT TIME: 8:15PM   CURRENT DATE: 06/11

PRESS [INFO] FOR DETAILS, [SELECT] TO TUNE.
PRESS [FEATURES] TO EXIT.

*FIG. 6*

| 06/11 | 8:00 | 8:30 | 9:00 | 9:30 |
|---|---|---|---|---|
| COMM 02 | LOCAL PROGRAMMING AND INFORMATION | | | |
| WSB 03 | FULL HOUSE | HOME IMPRVMENT | ROSEANNE | DOOGIE HOUSER |
| WAGA 04 | EVENING SHADE | MAJOR DAD | JAKE & THE FATMAN | |
| PPV 05 | TERMINATOR 2 R | | | |
| WATL 06 | A TOWN TORN APART TV | | | |
| WTBS 07 | BEVERLY HILLBILL | ANDY GRIFFITH | ADDAMS FAMILY | SANFORD & SON |
| CURRENT TIME : 8:15PM  CURRENT DATE : 06/11 | | | | |
| PRESS [INFO] FOR DETAILS, [SELECT] TO TUNE. PRESS [FEATURES] TO EXIT. | | | | |

FIG. 7

PAY-PER-VIEW

PLEASE ENTER YOUR PAY-PER-VIEW ACCESS NUMBER

TERMINATOR 2  $1.99
START TIME:  8:00 P.M.
CHANNEL 05 PPV

```
PAY-PER-VIEW

THANK YOU FOR ORDERING
     TERMINATOR 2
START TIME:  8:00 P.M.
   CHANNEL 05 PPV

- - - - -
YOU MAY VIEW OTHER CHANNELS
    BY PRESSING [MENU] OR
WAIT FOR THE FEATURE TO START
```

FIG. 9

```
PPV CH 05

TERMINATOR 2

ARNOLD SWARZENEGGER STARS IN FUTURISTIC
BATTLE TO SAVE HUMANITY FROM DESTRUCTION
BY RENEGADE COMPUTERS.

STARTS AT 8:00 PM ON 11/15

1. PURCHASE ($ 4.95)
            2. RECORD
            3. WATCH
```

FIG. 10

```
              CHANNEL LISTING
02 COMM     13 WXIA     24 WHSC    35 CITY
03 ABC      14 SHOW     25 WOPR    36 PUB
04 CBS      15 HBO      26 WMRJ    37 EDUC
05 MTV      16 ADS      27 NICK    38 TLC
06 WATL     17 CBN      28 WGN     39 DISC
07 WTBS     18 TMC      29 FNN     40 DISN
08 GPTV     19 CMAX     30 PLAY    41 CNN
09 WGNX     20 QVS      31 TRAV    42 HNN
10 TNT      21 INFO     32 BRAV    43 CSC
11 FOX      22 USA      33 BET     44 ESPN
12 NBC      23 AMC      34 UNI     MORE

PRESS [SELECT] TO TUNE, [MENU] TO EXIT.
```

FIG. 11

```
              FAVORITE CHANNELS
 02 COMM     11 WXIA      20 WHSC    29 CITY
 03 ABC      12 SHOW      21 WOPR    30 PUB
 04 CBS      13 HBO       22 WMRJ    31 EDUC
*05 MTV      14 ADS      *23 NICK    32 TLC
 06 WATL     15 CBN       24 WGN     33 DISC
 07 WTBS     16 TMC       25 FNN     34 DISN
 08 GPTV    *17 CMAX     *26 PLAY    35 CNN
 09 WGNX     18 QVS       27 TRAV    [CLEAR]
 10 TNT      19 INFO      28 BRAV    [MORE]

USE . . . TO HIGHLIGHT YOUR CHOICE, THEN
PRESS [SELECT]. A '*' MEANS CHANNEL IS
FAVORITE, PRESS [MENU] TO EXIT.
```

FIG. 12

```
PRESS [SELECT] TO CLEAR ALL FAVORITE
CHANNELS.

PRESS [LAST] TO RETURN TO FAVORITE CHANNELS.

PRESS [MENU] TO EXIT.
```

FIG. 13

```
            PAY-PER-VIEW

YOU CAN VIEW

TERMINATOR 2.  R

FOR ONE OF THE FOLLOWING PERIODS

ONCE           $1.99
1 DAY          $2.99
3 DAYS         $3.99
1 WEEK         $4.99

MOVE THE CURSOR TO HIGHLIGHT YOUR
CHOICE THEN PRESS SELECT
```

FIG. 14

```
            PAY-PER-VIEW

TO PURCHASE TERMINATOR 2. R
FOR A 1 DAY PERIOD - $2.99
SELECT A START TIME

1. CURRENT SHOWING
   (BEGAN 3 MINUTES AGO)
2. NEXT SHOWING
   (6:30 P.M.)
3. FUTURE SHOWINGS

MOVE THE CURSOR TO HIGHLIGHT YOUR
CHOICE THEN PRESS SELECT
```

FIG. 15

```
              PAY-PER-VIEW

PLEASE ENTER YOUR
              PAY-PER-VIEW
             ACCESS NUMBER

TERMINATOR 2.  R  $2.99
    STARTING JANUARY 30, CHANNEL 05 PPV
    AT 8:00 P.M.
    FOR A 1-DAY PERIOD

```
              PAY-PER-VIEW

TO PURCHASE TERMINATOR 2. R
    FOR A 1 DAY PERIOD - $2.99
    SELECT A START TIME

6:30   P.M.      10:30  P.M.
    7:00   P.M.      11:00  P.M.
    7:30   P.M.      11:30  P.M.
    8:00   P.M.      12:00  A.M.
    8:30   P.M.      12:30  A.M.
    9:00   P.M.      1:00   A.M.
    9:30   P.M.      1:30   A.M.
    10:00  P.M.      2:00   A.M.

MOVE THE CURSOR TO HIGHLIGHT YOUR
    CHOICE THEN PRESS SELECT
```

FIG. 17A

PAY-PER-VIEW

THANK YOU FOR ORDERING

TERMINATOR 2. R $2.99
STARTING JANUARY 30, CHANNEL 05 PPV
AT 8:00 P.M.
FOR A 1-DAY PERIOD

YOU MAY USE THE [PAUSE] [BACK] AND
[FWD] KEYS DURING THIS PROGRAM

YOU MAY VIEW OTHER CHANNELS BY PRESSING
[MENU] OR WAIT FOR THE PROGRAM TO START

FIG. 17B

12:42 A.M.                         CH 130
                                    PPV 05

TERMINATOR 2. R

PAUSE

MOVIE RESTARTS IN 9 MINUTES

PRESS SELECT NOW TO RESTART MOVIE
AND MISS 4 MINUTES

FIG. 18

```
        PAY-PER-VIEW
         SELECTIONS

1. OLYMPICS
2. MOVIES
3. SPORTS
4. NEW RELEASES
5. MISCELLANEOUS
6. WESTERNS
7. REVIEW YOUR PURCHASES
8. PREVIOUS PAGE
9. NEXT PAGE

MOVE THE CURSOR TO HIGHLIGHT YOUR
CHOICE THEN PRESS SELECT. PRESS INFO
FOR DETAILS
```

FIG. 19

```
        PAY-PER-VIEW
           SPORTS

1. MONSTER TRUCK 3
2. WRESTING MANIA
3. NHL STANLEY CUP
4. NFL SUPER BOWL
5. GEORGIA VS GEORGIA TECH
6. DAYTONA 500
7. INDIANAPOLIS 500
8. PREVIOUS PAGE
9. NEXT PAGE

MOVE THE CURSOR TO HIGHLIGHT YOUR
CHOICE THEN PRESS SELECT. PRESS INFO
FOR DETAILS
```

FIG. 20

```
PURCHASED SELECTIONS

TERMINATOR 2. R
    VIEWABLE UNTIL WED ON CHANNEL 05
MONSTER TRUCKS. 3 NR
    VIEWABLE UNTIL SAT ON CHANNEL 150
JFK. R
    08/16  8:00 P.M.

1. CANCEL PURCHASE
2. PURCHASE MORE PROGRAMS
3. PREVIOUS PAGE
4. NEXT PAGE

MOVE THE CURSOR TO HIGHLIGHT YOUR
CHOICE THEN PRESS SELECT.  PRESS MENU
TO EXIT
```

FIG. 21

```
YOU HAVE NOTHING PURCHASED
        AT THIS TIME

PLEASE PRESS SELECT
```

METHOD AND APPARATUS FOR PROVIDING INTERACTIVE ELECTRONIC PROGRAMMING GUIDE

This application is a continuation-in-part of application Ser. No. 07/983,910, entitled "Subscriber Terminal With A Plug In Expansion Card", filed Dec. 2, 1992, now issued U.S. Pat. No. 5,367,571, and application Ser. No. 983,909, now abandoned, entitled "Reprogrammable Subscriber Terminal", filed Dec. 11, 1992, and Ser. No. 07/984,038, entitled "Method of Providing Video On Demand With VCR Like Functions", filed Dec. 1, 1992, now issued U.S. Pat. No. 5,357,276.

BACKGROUND OF THE INVENTION

1. Related Application

This application is related by subject matter to application Ser. No. 08/229,805, entitled "Subscription Television System and Terminal for Enabling Simultaneous Display of Multiple Services" and application Ser. No. 08/229,717, entitled "System and Method for Providing Subscriber-Interactivity in a Television System, both filed Apr. 19, 1994.

2. Technical Field

This application relates to the field of subscription television systems, and more particularly, to providing an electronic program schedule to a user of a subscription television system, and allowing the user to select programs, including pay-per-view or video-on-demand programs, directly from the electronic program schedule.

3. Description of the Relevant Art

Cable, satellite, and over-the-air subscription television systems, generally referred to herein as subscription television systems, are known. Relatively recently, pay-per-view events were added as available choices on many subscription television systems. These events are available for purchase individually for a fee. The user selects the event, and there is a charge assessed against his account. The subscriber's equipment (normally referred to as a subscriber terminal or set top terminal) then tunes the event and performs any necessary descrambling. The user is then able to view the event.

In order to view a program, the subscriber must inform his service provider that he wishes to view the program. In many prior art systems, this has been complicated and inconvenient for the subscriber. In early systems, it was necessary for the subscriber to either mail a card or telephone the provider well in advance of the event and request that his terminal be authorized to view the event. This required significant preparation on the part of the subscriber. Unless the event was of very special interest to the subscriber, he was unlikely to engage in such preparation. Further, such systems did not provide for persons who, for example, found themselves unexpectedly home on a given night, and wanted to watch a pay-per-view movie. Responding to dissatisfaction over such systems, providers have more recently offered more sophisticated telephone authorization services, requiring a minimum of preparation time and/or cable return authorization services. Also, so-called impulse-pay-per-view systems have been introduced that allow a subscriber to choose an event directly from his subscriber terminal for immediate viewing.

However, even with the sophisticated phone authorization systems or impulse-pay-per-view systems, choosing a pay-per-view event has not proved to be a simple matter. With the phone authorization systems, the user must know a telephone number to call. He must then enter a series of seemingly meaningless numbers indicating the program choice, a customer identification number, and typically, a security number of some sort. With impulse-pay-per-view systems, the user must frequently work his way through long menus and also enter event codes and security numbers. The problem with such systems is that users are often intimidated by them. Many of the subscribers are unsophisticated and find it difficult to remember the steps necessary to purchase the events. Other subscribers are recalcitrant and unwilling to learn the complex steps required for pay-per-view operations. Such users do not purchase pay-per-view events, and accordingly, reduce the revenue the service provider would otherwise obtain. Moreover, these complicated systems have a degenerative effect because the subscribers become frustrated with their systems and in the future are unwilling to try new services offered by the cable company, dismissing them as too complex. As with all services provided on a fee basis, there is a drive in the industry to make purchase of pay-per-view events as easy as possible.

Recently, some companies have begun offering electronic television schedules for purchase by subscription television providers, who, in turn, provide the schedules to their customers. The schedules contain a listing of television programs by time and channel, and are typically displayed as a grid on the television screen. Such a system is shown in PCT Publication No. WO 92/04801, applied for by Insight Telecast, Inc. (hereinafter "the Insight system"). That publication describes a display system for maneuvering a cursor through a television schedule. The system also describes that a subscriber can choose a program for recording by moving a cursor to the selected program; the system will automatically program the customer's video cassette recorder. The Insight system provides week-long television schedule information. That information is downloaded into a subscriber terminal for use by the subscriber. Accordingly, the subscriber terminal must have significant memory. Further, most users of the guide are not seeking information one week in advance of the broadcast. The significant memory expense imposed by the Insight system is frequently not justified by the extra performance allowed by the one-week display.

Also recently, so-called near-video-on-demand services have been introduced. These services provide a simulation of the videotape rental experience. One such system is described in Walter, U.S. Pat. No. 5,168,353. Walker describes in column 4, lines 18–27 that a converter may be enabled to descramble two channels carrying the same program at staggered intervals. This allows returning to the same portion of the video after a pause equal to the staggered time interval. The Walker patent gives as an example a subscriber ordering a program that begins at 8:00 p.m. The converter unscrambles the 8:00 showing as well as the 8:15 showing so that the viewer may return to the same point in the program after a fifteen minute break. However, if the near-video-on-demand feature is to effectively compete with video rental stores, it must have additional features such as multiple pause features, rewind features and fast-forward features. In addition, the subscriber should find such a service to be user-friendly and easy to use.

SUMMARY OF THE INVENTION

In accordance with the invention, a television system is provided that includes an electronic program guide giving a schedule of programs available on the television system, including pay-per-view and video-on-demand programs.

The user may select programs for watching or recording directly from the electronic program guide. The selected programs may include pay-per-view and video-on-demand programs, which may be purchased directly from the guide. The programs may be purchased without entry of event codes or the like. Near video-on-demand features may be purchased for finite periods of time, and allow pause, rewind and fast-forward functions.

In another preferred embodiment of the invention, the program schedule information is obtained from a data provider specializing in providing that information, such as Insight Telecast, Inc. The headend then selects portions of that data for transmission to the subscribers. The headend can select portions to satisfy the needs of its subscribers taking into consideration other factors, such as terminal costs. The headend may also reformat the data in such a way as to provide it in a more useful format to its subscribers or add additional information of special interest to its subscribers.

BRIEF DESCRIPTION OF THE DRAWINGS

FIG. 5 is a screen illustrating an electronic programming guide in accordance with the invention, including time, channel and program data highlighted.

FIG. 6 is a screen illustrating an electronic programming guide displaying a pay-per-view event in accordance with the invention.

FIGS. 7 and 8 illustrate a purchase sequence for a pay-per-view event in accordance with the invention.

FIG. 9 illustrates an informational green for a subscription television event in accordance with the invention.

FIG. 10 illustrates a channel listing for a subscription television system in accordance with the invention.

FIG. 11 illustrates a favorite channel list for a subscription television system in accordance with the invention.

FIG. 12 illustrates a confirmation screen for use with a favorite channel list in a subscription television system in accordance with the invention.

FIGS. 13–17A illustrate a purchase sequence for a near-video-on-demand feature of a subscription television system in accordance with the invention.

FIG. 17B illustrates a pause sequence for a near-video-on-demand feature of a subscription television system in accordance with the invention.

FIGS. 18 and 19 illustrate pay-per-view selection options in a subscription television system in accordance with the invention.

FIGS. 20 and 21 illustrate a purchased pay-per-view events review option in a subscription television system in accordance with the invention.

DETAILED DESCRIPTION OF THE PREFERRED EMBODIMENTS

Figure 1:
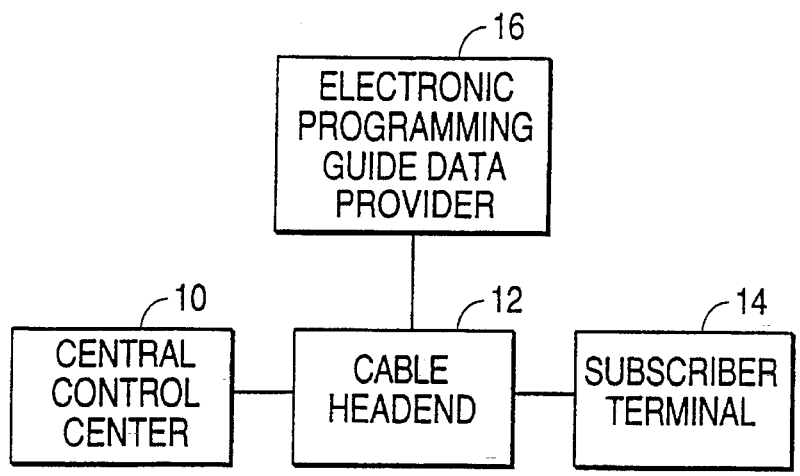
FIG. 1 is a block diagram of a subscription television system in accordance with the invention.

FIG. 1 shows a generalized block diagram of a subscription television system according to the instant invention. The system of FIG. 1 is for example only and should not be construed as limiting the invention. A central control center 10 orchestrates the operation of the subscription television system. Central control center 10 is often associated with the central office of a multi-service operator and may communicate with and control headends in many cities. Headend 12 provides subscription service to a local area, e.g., one city or a region including one or more cities or towns. A subscriber terminal 14 is also shown and would be located in a subscriber's home or business. Of course, in a typical subscription television system, there would be hundreds or thousands of such subscriber terminals. Finally, an electronic programming guide data provider 16 is shown. Electronic programming guide data provider 16 supplies television schedule information to headend 12. The lines connecting central control center 10 to headend 12 and electronic programming guide data provider 16 to headend 12 indicate communication paths. Data may be communicated along those paths by any known means including telephone networks, satellite transmissions, optical fibers or other transmission lines, etc. A distribution system connects headend 12 to each subscriber terminal 14. Frequently, the distribution system consists of transmission lines and line extenders, but may include coaxial cables, optical fibers, satellite uplinks and downlinks, other broadband transmission paths and combinations thereof.

Figure 2:
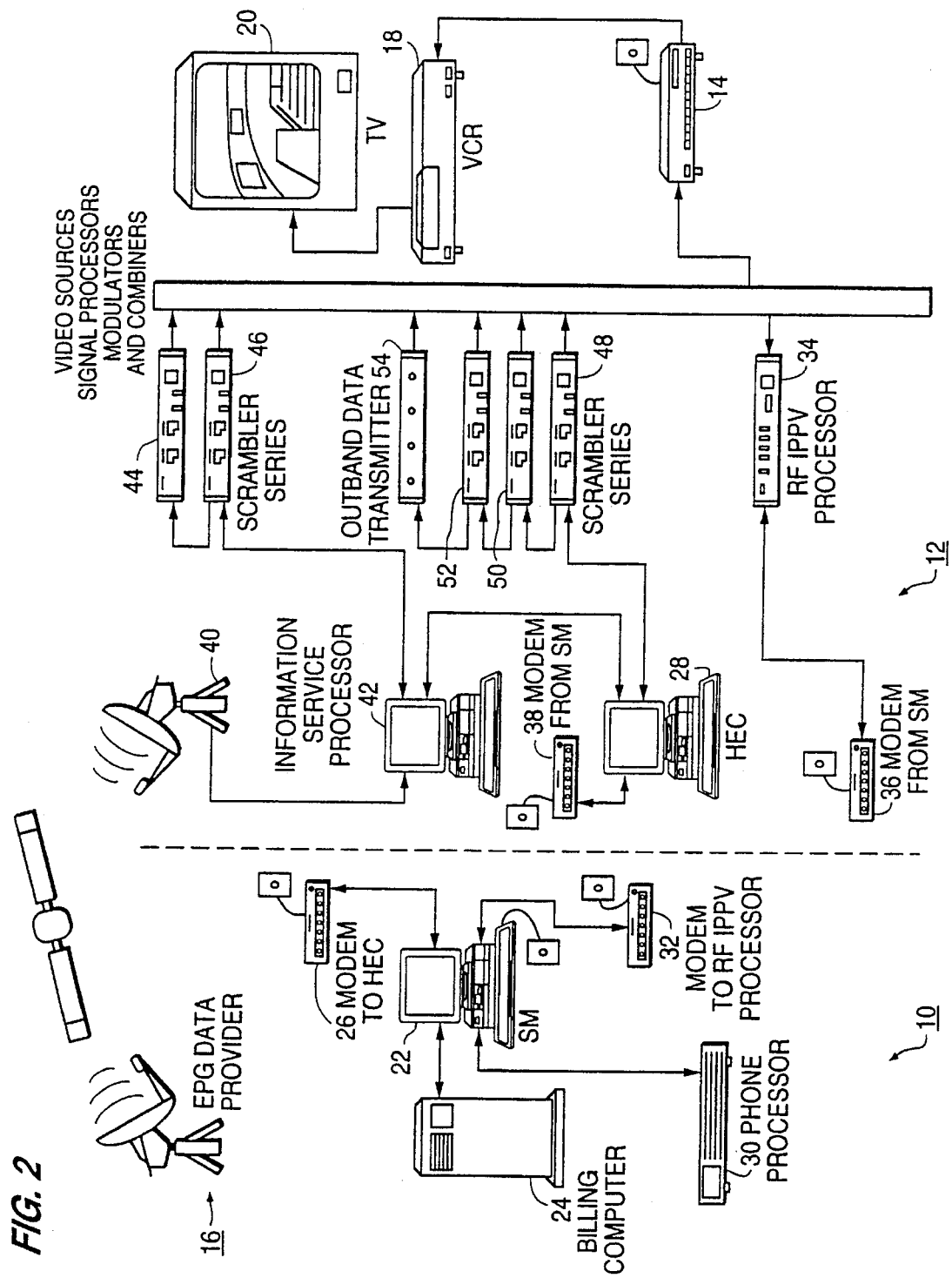
FIG. 2 is a detailed block diagram of a subscription television system in accordance with the invention.

FIG. 2 is a more detailed diagram of the system shown in FIG. 1. On the left side of the dotted line is shown electronic programming guide ("EPG") data provider 16 and central control center 10. In the center portion of FIG. 2 is shown headend 12 in detail. Finally, in the right portion of FIG. 2 is shown a subscriber terminal 14 and associated equipment (VCR 18 and television 20).

In this preferred embodiment the EPG data provider 16 transmits EPG data by satellite to headend 12. This data includes program information arranged by time and channel. One such service is offered by Insight Telecast Inc. The Insight service provides extensive television program listings. Subscription television system operators can purchase this data and provide it to their subscribers.

Central control center 10 includes a system manager 22 that directs the other components of central control center 10. Once example of a system manager 22 is Scientific-Atlanta's System Manager 10 network controller. Central control center 10 may, for example, provide billing services for the provider, including billing for pay-per-view events. A billing computer 24 stores billing data and may also format and print bills. Modems 26 and 38 allow data transmissions between system manager 22 and headend controller ("HEC") 28. For example, authorization data may be transmitted from system manager 22 to HEC 28. HEC 28 formats the authorization data and transmits it to subscriber terminals either in-band through scramblers 48, 50 or 52 or out-of-band through outband data transmitter 54. HEC 28 may conveniently comprise a Scientific-Atlanta Model 8658 for controlling transmission of data streams to scramblers 48, 50, 52 and outband transmitter 54. Billing data from the subscribers can be received through either phone processor 30 or modem 32. Subscriber terminal 14 can either transmit billing data over a telephone line directly to the phone processor 30 or back up the cable to RF IPPV processor 34, depending on its configuration. Subscriber terminal 14 can either include a phone communication module or an RF communication module, which is used to transmit the billing data. If the data is sent to RF IPPV processor 34, it is sent by modem 36 associated with RF IPPV processor 34 to modem 32 associated with system manager 22. System manager 22 accumulates the billing data from phone processor 30 and modem 32 and provides it to billing computer 24 so that customers may be billed for their program services.

Turning now to headend 12, the EPG data is received by a satellite receiver 40 and passed to information service processor 42. Information service processor ("ISP") 42 may also receive text data for transmission to subscribers. The text data may include weather information, sports scores, messages, etc. and may be provided by an information service provider or generated by the cable provider. ISP 42 is responsible for receiving the EPG data well as the other data, and transmitting it to the subscribers. ISP 42 provides data to scramblers 44 and 46. Of course, the actual number of scramblers to which the ISP provides data would depend on many factors, including the amount of data to be transmitted and the speed at which the data must be supplied and updated. The EPG and text data is repetitively sent our by the scramblers. If there is only one scrambler, and a lot of such data, the repetition rate will be slow. Use of more than one scrambler allow the data repetition rate to increase. The two scramblers 44 and 46 in FIG. 2 are for example only.

Scramblers 44 and 46 place data in-band for transmission to subscribers, along with scrambling an associated television signal. The EPG data and text data in a preferred embodiment are placed in the vertical blanking interval, but may also be placed elsewhere in the 6 MHz channel. For example, data could be amplitude modulated on sound carrier as in known in the prior art. Herein a 6 MHz NTSC analog television signal is considered by way of example but the invention should not be so limited. The television signal may be in PAL or SECAM format, digital or digitally compressed data or may comprise a wider bandwidth high definition television signal. As herein described, in-band transmission means the transmission of data within the video television channel comprising both audio and video carriers. The data may be transmitted by amplitude modulation on the sound carrier, hereinafter in-band audio data or in the video signal during unused portions such as data channels of an MPEG compressed video data stream or the vertical or horizontal blanking periods of an analog television signal.

The EPG data received by satellite receiver 40 will often be very extensive, containing data for programs up to one or two weeks in advance. If all this data is to be transmitted to subscriber terminal 14, the terminal must be able to store the data in its memory. To store that much information requires a significant amount of memory. Providing extra memory in the subscriber terminals is expensive because of the hundreds or thousands of such terminals that are in a typical cable system. Frequently, customers may prefer a less expensive unit that provides only a portion of the data supplied by EPG data provide 16, such as the next few hours. The customers can then benefit from lower cable service bills or purchase expenses if customers are to own the terminals. Thus, ISP 42 is provided with the capability of selecting only certain portions of the EPG data to be transmitted to subscribers. ISP 42 receives the EPG data, selects the portion to be transmitted to subscribers and passes only that portion to a scrambler (44 and/or 46). By selecting only a portion of the data provided by EPG data provider 16, less data is transmitted than would otherwise be the case. Thus, the data repetition rate is increased. Not only may ISP 42 select portions of the EPG data, but it may also add data on local stations not covered by EPG data provider 16. ISP 42 may also reformat the data in such a way as to make it more pleasing to the subscribers.

As stated, in a preferred embodiment, the EPG data is transmitted in the vertical blanking interval of at least one of the television signals. EPG data is constantly being transmitted in the vertical blanking internal by the scramblers. Scramblers 44 and 46 have memory dedicated to storing the EPG data. The amount of memory depends on the size of the EPG to be transmitted to the subscribers. If the ISP is going to select only a small portion of the EPG data provided by the EPG data provider, e.g., a few hours, then a small memory, perhaps 128k bytes, may be sufficient. For larger segments, 512k bytes may be necessary. And, for a couple of weeks of programming data, 1M bytes may be required. The ISP periodically updates the scrambler memory with new data received from the EPG data provider 16. ISP 42 tags the data as either long term or short term, depending on whether the data concerns a shortly upcoming program or a more distant one. The scrambler sends out the short term data more frequently than the long term data. This is because the EPG is stored in memory at the subscriber terminal 14, and must be updated frequently. But the subscriber terminal is not constantly tuned to channel where the EPG data is located. As will be described later, the subscriber terminal 14 tunes to the EPG data channel wherever possible to obtain update information. By sending out short term data very frequently, it is likely that a given subscriber terminal will have accurate short term data stored in it, which is the most important data to a user of the subscriber terminal. Long term data is sent out less frequently. Programming changes may also be grouped with the short term data.

As discussed above, ISP 42 may also receive text data from an information service provider, such as a stock quote service. ISP 42 can also generate text locally. For example, ISP 42 may generate messages for transmission to subscribers concerning upcoming events or service interruptions or changes. If received from an information service provider, the text data may either be transmitted as received or reformatted by ISP 42, then transmitted to a scrambler (44 or 46) for transmission to subscribers.

ISP 42 also passes data to headend controller ("HEC") 28, which controls scramblers 48, 50 and 52, and also outband data transmitter 54. The scramblers 48, 50 and 52 scramble television signals and may also insert in-band data. The outband data transmitter 54 transmits data on a separate carrier, i.e., not within a 6 MHz channel. In a preferred embodiment, the out-of-band carrier is at 108.2 MHz, but other out-of-band carriers may also be used. The data transmitted under the control of HEC 28 may be, for example, descrambling information. In a preferred embodiment, data is inserted in each vertical blanking interval to indicate the type of scrambling employed in the next video field. Scrambling systems are well known in the art. For example, sync suppression scrambling, video inversion scrambling, etc or some combination of scrambling techniques may be used. Further, authorization information could be transmitted; this information would authorize the reception of channels or programs. Data may also be transmitted over non-scrambled channels via data repeaters (not shown) such as a Scientific-Atlanta Model 8556-100 data repeater either as in band audio or video data.

Some of the information transmitted would be global, i.e., every subscriber would get it. For example, the descrambling information could be a global transmission. Note that just because each subscriber receives the descrambling information does not mean that each subscriber terminal can descramble a received signal. Rather, only authorized subscriber terminals would be capable of descrambling the received signal. On the other hand, data transmissions may be addressed transmissions. For example, authorization data would normally be addressed to individual subscribers. That is, when transmitted, the data will have an address (for example, a subscriber terminal serial number) associated with it. The subscriber terminal addressed will receive the data and respond accordingly. Other subscriber terminals will ignore the data. Further, there can be group addressed data, which will affect groups of subscribers. The outputs of scramblers 44, 46, 48, 50, 52 and outband data transmitter 54 are passed to any necessary processing equipment, such as signal processors, modulators and combiners. These elements are generally indicated as block 56 and do not form a part of the instant invention. A distribution system 58 leads to a subscriber terminal 14.

At the subscriber location, a subscriber terminal 14 is found. At the subscriber location, subscriber terminal 14 is connected to the subscriber's video equipment, including, for example, a VCR 18 and television 20. Multiple subscriber terminals 14 may be located at a premises with several television receivers 20.

Figure 3:
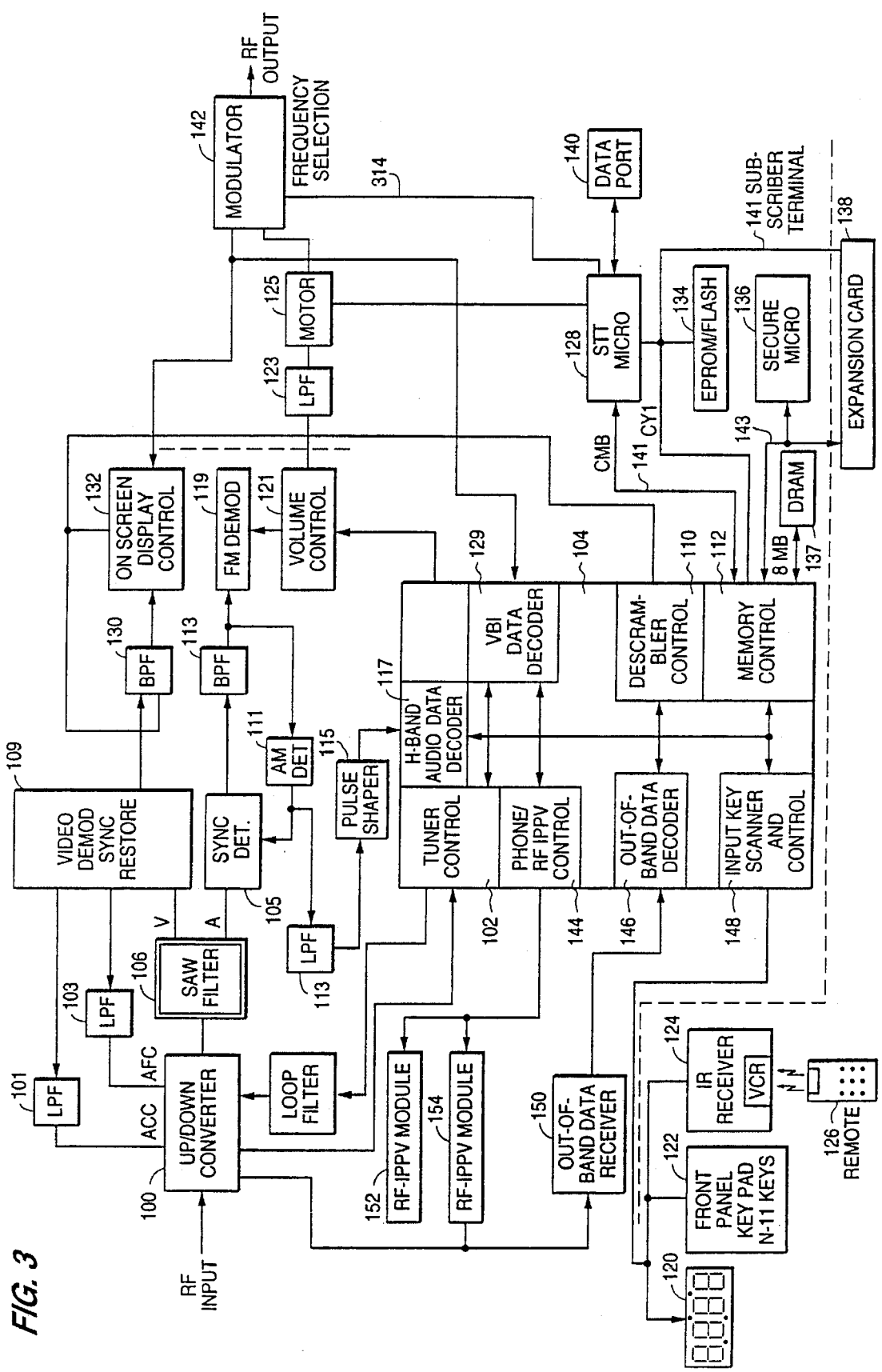
FIG. 3 is a block diagram of a decoder in accordance with the invention.

FIG. 3 is a detailed block diagram of the decoder. Referring to FIG. 3, a detailed black diagram of one of the subscriber terminals will now be described. The broadband television signal from the signal distribution system 58 is received at the input of up/down converter or tuner 100. Conventionally, the up/down converter 100 may include an input filter, such as a diplexer, to separate the 108.2 MHz out-of-band signal and the broadband television signal. More than one tuner may be provided (not shown) to provide, for example, picture-in-picture services or watch/record modes. An out-of-band data receiver 150 is coupled to tuner 100 to receive the separated out-of-band data. The up/down converter 100 can be tuned to a predetermined channel for receiving in-band video and audio data when not in use. The channel may be predetermined from the system manager 22 and, by one of the data transmission methods described herein, the predetermined channel identification can be stored in the subscriber terminal 14.

When in use, the up/down converter 100 is tuned according to a channel selected by a subscriber via a user interface having an infrared (IR) receiver 124, remote control 126 and terminal keypad 122. Up/down converter 100 uses a phase locked loop under the control of a tuning control 102 to convert the selected or predetermined default RF channel signal to a 45.75 MHz intermediate frequency signal. A multifunction control circuit (MCC) 104 is linked to up/down converter 100 by a bidirectional link to the tuner control 102. The MCC 104 is preferably an application specific integrated circuit (ASIC) combining many subscriber terminal control and data handling functions into a single package. Of course, the ASIC may include any combination of individual control circuits. Alternatively or in addition, other control circuitry may be used, for example a microprocessor.

The bidirectional link may include one path for tuning and a return path for feedback control of the tuning process. A feedback signal for automatic gain control and one for automatic frequency control are transmitted to the up/down converter 100 through filters 101, 103, respectively from a video demodulator.

A filter, for example a SAW filter 106, filters the IF channel signal to split the signal into separate video and audio portions for processing. The video portion is demodulated and descrambled by the video demodulator and descrambler 109 under the control of the descrambler control 110 of the MCC 104. For example, the video demodulator 109 may perform sync restoration (one form of descrambling of the video signal) for sync suppression scrambling. The video signal then passes through a bandpass filter 130 to an on-screen display control 132 where inverse video inversion (descrambling) takes place, if necessary. The descrambling of the video portion, whether sync suppression, sync inversion, video line inversion, etc., is under the control of the descrambler control 110 of the MCC 104. The descrambler control 110 provides the necessary timing signals, inversion axis levels, and whether the video is inverted or not to the on-screen display control 132 and supplies the necessary timing, restoration levels, and identification sync pulses to be restored to the video demodulator 109. The descrambler control 110 receives such descrambling information either from pulses as in-band audio data or from data modulated on the video during the vertical blanking interval.

In the other path, the audio signal is converted from the 41.25 MHz IF carrier to the intermodulation frequency of 4.5 MHz by a synchronous detector 105. Feedback for automatic gain control of detector 105 is supplied from the output of bandpass filter 131. The audio signal may then be demodulated by an FM demodulator 119. An amplitude modulation detector 111 performs pulse detection to recover the in-band audio data which are amplitude modulated onto the audio carrier. The received in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation.

Volume control of the audio signal is performed under control of a volume control 41 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI detector. The in-band video data is transmitted at a frequency on the order of known teletext systems, such as 4.0 megabits per second. However, the invention should not be considered limited in this respect. A data clock provides an appropriate sampling frequency higher than the Nyquist rate according to well known techniques. The VBI data decoder 129 stores the data in DRAM 137 prior to processing by the microprocessor. Additional details of the VBI data decoder can be found in application Ser. No. 08/229,805, which is expressly incorporated herein by reference. Further, the time-of-day is transmitted by the headend and stored in DRAM 137. For example, global time-of-day transmissions may periodically occur, based on satellite time standards as described in U.S. Pat. No. 4,994,908, the teaching of which are incorporated herein by reference. Microprocessor 128 therefore has access to data indicating the current time.

The on-screen display control 132 selectively generates on-screen character and graphics displays in place of or overlaid on the video signal. For example, the information stored in DRAM 137 by the VBI data decoder 129 may be read out to the on-screen display control and used to generate on-screen characters and/or graphics. The modulator 142 combines the video signal from the output of the on-screen display control 132 and the audio signal from the output of the mute control circuit 125 and converts the combined signal to the channel frequency selected by the microprocessor 128, such as channel 3/4 for NTSC. The combined and remodulated signal is supplied as an RF output to a television receiver in a well known manner.

A control microprocessor 128 controls the overall operation of the subscriber terminal 14. The subscriber communicates with and controls the microprocessor 128 through an interactive user interface with an on-screen display. The user interface includes keyboard 122 on the front panel of the subscriber terminal 14 and the remote control 126 which generates subscriber control signals for channel tuning, volume level control, feature selection, and the like. These subscriber commands are decoded by an input scanner and control 148 of the MCC 104. The remote IR receiver 124 of the user interface receives the commands from the IR or other remote control 126, as is well known in the art, and provides commands to the microprocessor 128. The user interface may additionally include a display, for example, a four-digit, seven segment LED display, which displays the tuned channel numbers and diagnostics.

When the keypad 122 or remote control 126 is utilized to select a command, the microprocessor 128 operates to execute the command. The subscriber terminal interacts with the subscriber by providing numerous on-screen displays which assists in the operation of the terminal. The on-screen displays provide information and prompts to guide the subscriber through many of the complex features of the terminal. For example, the on-screen display may implement a menu page structure for providing screen-by-screen directions for using the subscriber terminal and its features.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of the MCC 104 carries out descrambling on a particular channel or what form of descrambling is required at a particular time by interpreting the authorization and control data downloaded from the system manager 22 (by any of the three data transmission schemes discussed herein, out-of-band, in-band audio or in-band video) into the internal non-volatile memory (NVM) of the device. The NVM in the secure microprocessor 136 stores secure data, for example, authorization data, scrambled channel data, some terminal configuration data and other required data.

The control processor 128 operates by running a control program which preferably is partially stored in a read-only memory internal to the processor and partially stored in an NVM, such as Flash EPROM memory 134. On-board clocks are provided for clocking the various circuits elements of the terminal. In addition, the control program of the microprocessor 128 may also reside in the NVM of an expansion card 138. The microprocessor 128 communicates with the NVM 134, 138 via a memory bus 141 which has data, address, and control lines. The microprocessor 128 also controls the data decoders 117, 129 and 146, volume control 41, on-screen display control 132, and the tuner control 102, descrambler control 110 and input key scanner and control 148 via commands through MCC 104 and control processor bus (CMB) 131. The microprocessor 128 directly controls the mute switch 125 and the output frequency selection of the modulator 142. The microprocessor 128 includes additional capacity for other auxiliary device communications and control through a data port 140. For example, the data port may accommodate an IR blaster for VCR control via an on-screen menu, an additional subscriber terminal for dual tuner operation, or connection to a digital video subscriber terminal.

The subscriber terminal 14 may receive addressable and global data, other text data, and descrambler data transmitted from the headend 12 via the in-band vertical blanking interval (VBI). Alternatively or in addition, addressable and global data may be transmitted in a separate out-of-band data carrier if an out-of-band receiver is provided. The memory control 112 permits data coming from the three data decoders 117, 129, and 146 to be placed in a volatile memory, for example DRAM 137. There it can be accessed by the control microprocessor 128 via the CMB 131. The MCC 104 also distributes control instructions from the control microprocessor 128 to other parts of the MCC 104 to provide operation of the rest of subscriber terminal 14. The MCC 104 additionally connects to a secure microprocessor bus (SMB) 143 which permits communications between the secure microprocessor 136 and other portions of the subscriber terminal 14. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests from the microprocessors 128, 136 and other controls and data decoders to write to memory or read from memory. It resolves contentions for memory transfers, giving priority to real time applications and the micro-processors, and schedules the data flow. The microprocessors 128, 136 communicate through internal registers of the MCC 104 with the memory control 112 and other portions of the MCC 104.

The expansion card 138 may be a printed card which contains memory and/or secure microprocessor components, which can be plugged into a connector 200. The connector 200 can be configured such that, when it receives the expansion card 138, the expansion card is flush with top cover. The connector 200 electrically extends the control microprocessor memory bus 141 and the secure microprocessor bus 143 to the expansion card 138. Additional program or data memory, renewed security, or any other application supported by microprocessors 128, 136 can be provided by the expansion card 138. In addition, circuitry coupled to microprocessor 126 may be provided for detecting whether or not the expansion card is installed. Thus, the subscriber terminal 14 may be controlled in accordance with information contained on the expansion card 138 when installed and in accordance with internal software when the expansion card 138 is not installed. Additional details concerning the expansion card 138 may be obtained from U.S. patent application Ser. No. 07/983,910, entitled "Subscriber Terminal with Plug In Expansion Card", which is incorporated herein by reference.

The subscriber terminal may optionally include an impulse-pay-per-view (IPPV) module of the telephone type 252 or of the RF-IPPV type 154. Alternatively, such reverse path information may be transmitted via an optical link. The IPPV module allows subscribers to request authorization of their subscriber terminal to receive pay events such as pay-per-view events or near-video-on-demand (NVOD) transactions, store the data associated with the purchase of the event in the NVM of the secure microprocessor 136, and then transmit the data to the system manager 22 via the telephone return path or the RF return path via the signal distribution system.

Furthermore, "interactive television" information may be transmitted to the system manager 22 via the RF or telephone IPPV module or other reverse path transmission. In such case, the subscriber terminal may receive information defining a menu which may be immediately displayed. When the user responds to a menu prompt, the resulting information may be immediately transmitted as return data.

For example, the user may respond to a poll by entering information to the keyboard. The results of the poll may be determined at the head end and later reported to the subscriber terminals. Additional details concerning the interactive television can be obtained from U.S. patent application Ser. No. 08/229,717, filed concurrently herewith, and expressly incorporated herein by reference.

Figure 4A:
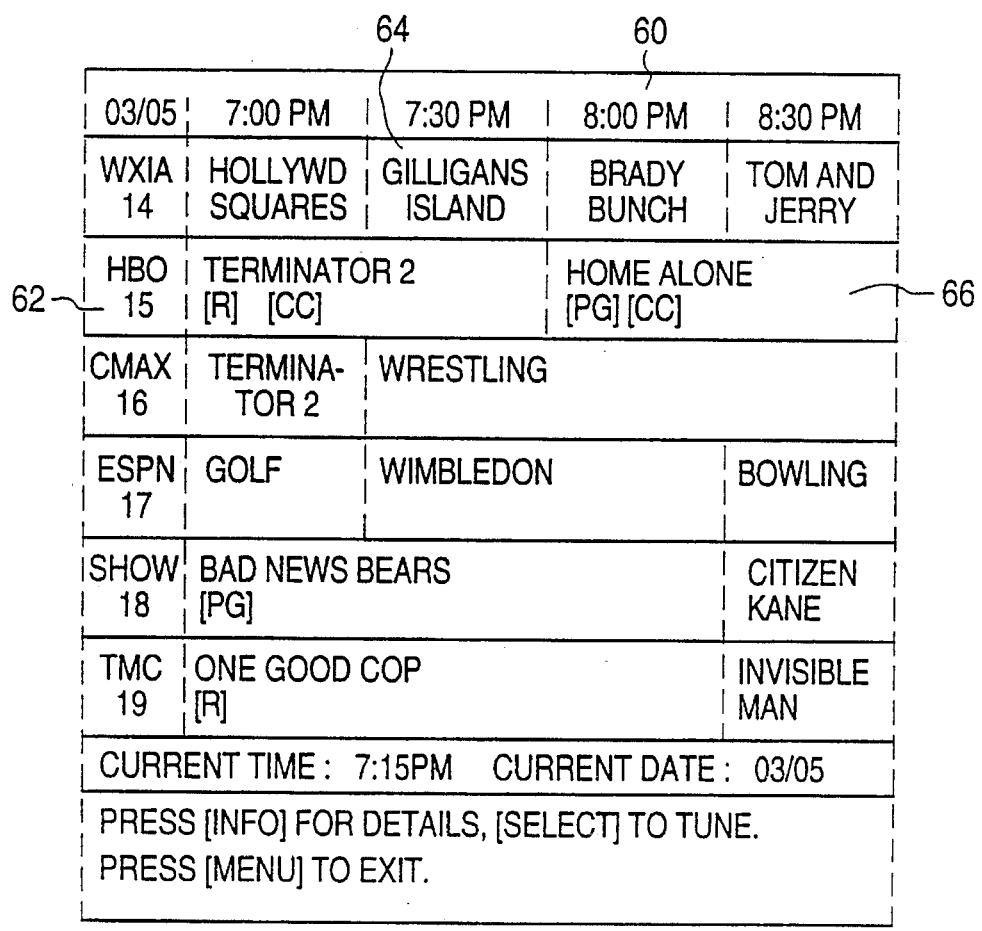
FIG. 4A is a screen illustrating an electronic programming guide in accordance with the invention.

FIG. 4A shows a screen of the electronic programming guide provided in accordance with one embodiment of the invention. The electronic programming guide is produced by the subscriber terminal 14 from data stored in its memory. The memory and memory control circuitry was described in regard to FIG. 3. The EPG may be activated and displayed from the subscriber terminal or a remote control, such as remote control 126 in FIG. 3. For example, a switch on remote control 126 may be labeled as "Programming Guide" or the EPG may be selected from a menu provided by subscriber terminal 14. Further, keyboard 122 on terminal 14 may also be used to activate the programming guide.

Horizontally indicated at block 60 are date and time slots. Channel selections appear vertically on the left side of the screen. Of course, the arrangement of the channels and times could be reversed in an alternative embodiment. For example, at block 62 is found HBO, which is channel 15 in the figure. The name of a television program is associated with each time slot and channel slot. For example, associated with the 7:30 p.m. time slot and channel 14 is "Gilligans Island", shown at block 64. The channels on the left-hand side of the EPG are arranged in numerical order from top to bottom. When the EPG feature is first activated, the screen will show the current channel tuned, for example, in the third-from-top channel slot, with the corresponding program descriptions highlighted to indicate a cursor. The description will include the title, and may include other information such as ratings or an indication that the program is closed-captioned. For example, block 66 provides all of this information. The time slots initially shown, for example, will be the slot starting at the last 30-minute or 1-hour slot and the next three 30-minute slots. Of course, the default features described are for example only and others may be used in accordance with the invention.

The remote control 126 will be provided with cursor direction keys "UP", "DOWN", "LEFT" and "RIGHT" or arrows representing these directions. These keys move the cursor around the EPG. The cursor moves in 30-minute and one channel increments. The current placement of the cursor is indicated by a highlighted program at that location. The cursor placement may also be indicated by highlighting the channel and time selected at the cursor location. See FIG. 5, for example, where the cursor is on "Jake & the Fatman" and WAGA channel 4 is highlighted along with the 9:00 start time. When the cursor reaches the edge of the screen, the entire screen is shifted one slot each time a direction key is actuated to seek information not visible on the screen. Movement is similar to movement within a spreadsheet on a computer. When the subscriber reaches the last available time slot, the cursor will move no further in that direction. The terminal could provide that the cursor wrap-around to the first time slot on reaching the end, but that is not required and may even be confusing to the user. However, in preferred embodiment, the cursor does wraparound from highest channel to lowest channel and vice-versa. This allows the viewer to reach a channel of choice more quickly using the cursor keys. Further, direct channel entry is supported in the EPG mode. Direct channel entry moves the window to display the information on the channel the user selects and places the cursor on that channel. However, the terminal does not tune that channel unless the user selects it by actuating the "SELECT" key on remote 126. Further, when the cursor is located on a program, the user may request more information on the program by activating an "INFO" key on his remote. This will open a window giving additional information on the program, if such information is available. The information might include guest star listings or a summary of the program.

When the left or right cursor direction keys are held down, the screen increments twice in 30-minute steps, and then goes into a "fast mode". In the fast mode, the screen shifts in 2-hour increments, 4 times a second, but only the time and date bar is updated. The programming cells are left empty until the subscriber releases the key, at which point, they fill with the relevant programming information. The fast mode gives an effective rate of 8 hours per second. When the cursor is moved vertically from a large time block to a smaller time block, the cursor stays in the same time block.

When the cursor is over a feature the user would like to see, then a "SELECT" switch is actuated and that channel is tuned. Alternatively, the "SELECT" switch may drop the user into a menu that allows him to either watch the program or record it. If the watch option is chosen, the channel is tuned. If the record option is chosen, the terminal will program VCR 18 to record the program, or at least program itself to turn on and tune the proper channel when the program is available.

Pay-per-view events may also be chosen from the EPG. Referring to FIG. 5 again, pay-per-view events are available on channel 5. Pay-per-view events need not be dedicated to a particular channel but, in the present example, channel 5 is dedicated to pay-per-view programs. The pay-per-view event shown is "Terminator 2". Note that simply using the select key to tune that station will not enable viewing as the program is scrambled. Rather, the user must purchase the program. The user places the cursor over the program, then activates a "BUY" button. The user may preferably be required to confirm his choice by activating the "BUY" button again to avoid accidental purchases. The user may also have to enter a security number to complete this purchase. The user may chose whether this feature is activated. For users with children, babysitters, etc. in the home, the security number feature may be activated. For those who want simple programming, it may be deactivated.

FIGS. 6–8 illustrate pay-per-view selection from the viewing guide. FIG. 6 shows a pay-per-view ("PPV") selection highlighted. Note in this figure, the pay-per-view selection is on a white background while non-selected slots are on a grey background. In FIG. 5, the background for the selected slot was black. Any method indicating the selection may be used and falls within the scope of the invention. From this point the user would press "BUY" to purchase "Terminator 2". The user will then preferably be requested to confirm the selection by pressing "BUY" again.

If the user has the security number feature activated then a screen as shown in FIG. 7 will appear. The user will be asked to enter his security number. If entered correctly, the screen of FIG. 8 will appear indicating that the order has been entered. If the user has not selected the security number feature, then after the "BUY" key is pressed to confirm the purchase, the screen of FIG. 8 will appear.

The user can then wait for the event to begin. At the appropriate time, the subscriber terminal will tune the purchased event. Or the user can watch other programs until the event begins. If the user chooses to watch other programs until the event begins, a message will alert the user that the event has begun and that he should tune to it. Alternatively, the terminal may automatically tune to the event when it begins.

More details of the electronic programming guide and associated features will now be described. As discussed above, the EPG allows a subscriber to view a schedule of programming for the next several hours. The actual number of hours depends on the amount of memory installed. The EPG information is downloaded from the headend via data transactions and is stored in RAM. Of course, since programs are constantly being shown, this original data quickly becomes outdated. Therefore, update data is constantly sent to the terminal on an EPG data channel. Even though referenced as an EPG data channel, the channel need not be limited to EPG data. In fact, it can contain video, with the updated EPG data being placed in the vertical blanking interval. The subscriber terminal tunes to the EPG data channel whenever possible. For example, when the terminal is turned off, it enters an off mode and tunes a default channel, called an "off" channel. However, the terminal frequently tunes back to the EPG channel for updated information. In a preferred embodiment, the EPG data channel is tuned every 30 minutes to obtain updates. After the update, the off channel is retuned. Therefore, as programs are shown, the memory allocated to their listings is replaced with data concerning future programs. Similarly, during menu operations, the terminal may tune the EPG data channels for an update. Of course, when the user enters the EPG mode, the terminal automatically tunes the EPG data channels to update its memory.

The data displayed by the EPG can be varied according to system requirements. However, it must be recalled that this data is stored in memory in the subscriber terminal. Therefore, the more information given about a specific program, the fewer the number of programs than can be described with a given memory size. Terminals with as little memory as 256k bytes will display a few hours of programming, while 1M bytes will give 2 days of programming. With 4M bytes of memory, up to two weeks of programming may be stored. As discussed above, large memories add cost to the system. However, VCR programming options will be less useful unless at least one or two weeks of programming are available on the EPG as most VCRs have 7 or 14 day timers.

Figure 4B:
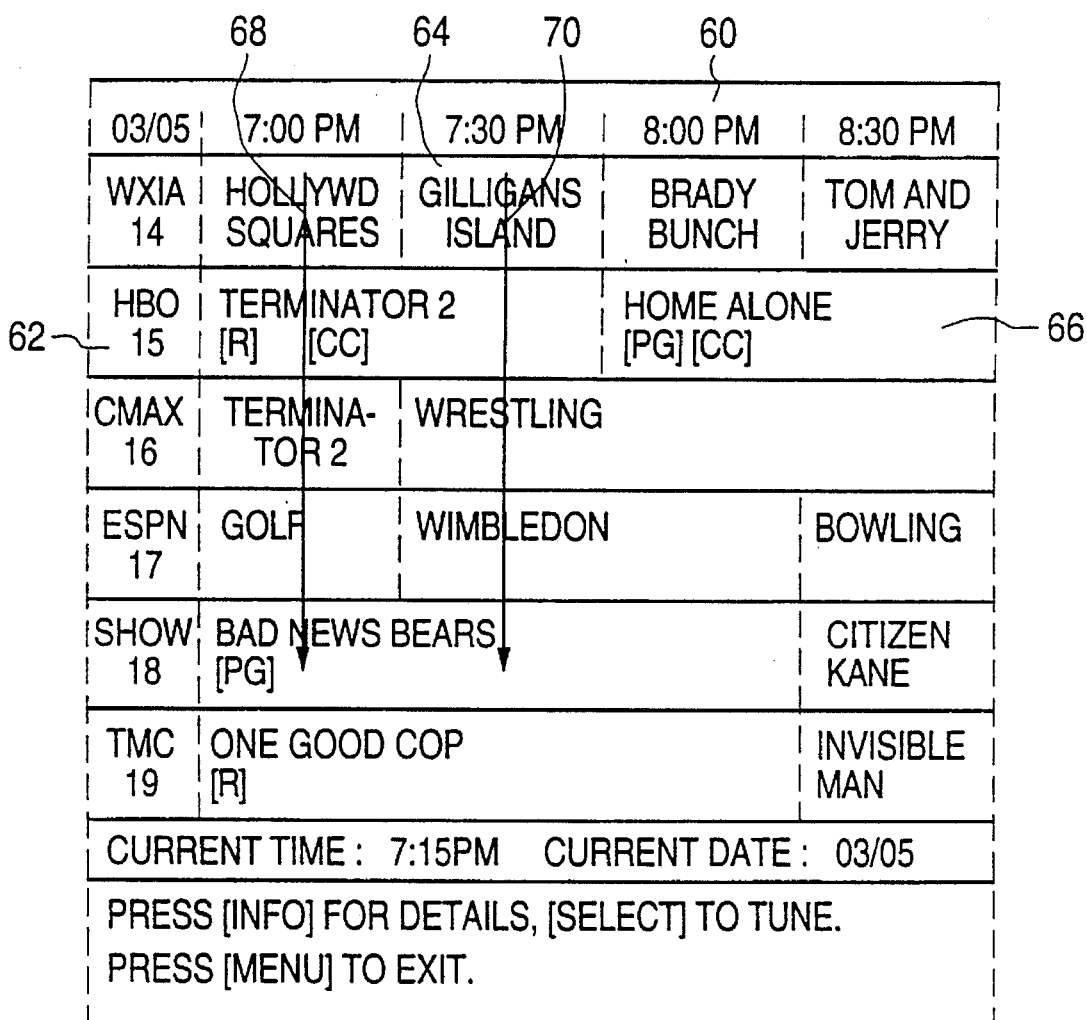
FIG. 4B illustrates the loading of the subscriber terminal memory with electronic programming guide data.

Some description of the storing and updating of the EPG data is necessary for a full appreciation for the invention. The EPG data sent by the scramblers (or data repeaters) is tagged to indicate the date, time, and channel with which it is associated. That data is received by the subscriber terminal. When the subscriber terminal receives data corresponding to the current day and half-hour, it begins storing that data in its memory for all the channels. The subscriber terminal then receives and stores data for the next half-hour slot for that day for all channels. This continues until the subscriber terminal exhausts the memory allocated for the EPG. Subsequent EPG data for future times is ignored. Therefore, decoders with different memory sizes can be accommodated in the same system. If one subscriber terminal has 256k bytes of memory, and can only store a few hours of the EPG, the terminal stores that much and ignores the rest. On the other hand, if the terminal includes 4M bytes of data, it may store up to that much data. Referring to FIG. 4B, the update process shown. First, data in the direction of arrow 68 is stored because that data corresponds to the current hour and date. Data is stored for all channels for that time and date. In other words the entire column under "7:00 PM" is stored in memory. Data from the 7:30 p.m. time slot is then stored in memory as indicated by the arrow 70. This process continues until the memory of the subscriber terminal allocated for EPG storage is filled.

The amount of memory allocated for EPG storage depends, of course, on the total memory available in the subscriber terminal. The system manager 22 via HEC 28, in a preferred embodiment, initiates the transmission of group addressed data to subscriber terminal groups indicating the amount of memory the terminals should allocate to the EPG via scramblers, data repeaters or out-of-band transmitters. Each subscriber terminal group contains subscriber terminals of a given memory size. Thus, the groups will each receive data instructing them to allocate the proper amount of data to the EPG, which amount will depend on the memory available in the terminals of the recipient group.

Yet another limitation on the EPG is the number of characters that will fit in a slot of the EPG grid. For example, in the preferred embodiment, 30-minute shows must be described in 18 characters or less, that is, two lines of nine characters each. For shows one hour or longer, up to 38 characters may be used, two lines of 19 characters. The number of characters available for a one-hour show is slightly more than twice the number available for a 30-minute show because the bar separating 30-minute shows may be used for additional data characters. Also, the background of the EPG may be selected to indicate a theme. For example, all westerns could be on a blue background, all sports on a red background. Use of such categories also allows a category listing to be provided by the terminal. For instance, the terminal can display all sports event for a given day. Categories are, in a preferred embodiment, arranged in a tree structure. Thus, when choosing to see what sports programs are to be shown on a given day, the user might receive another menu, one offering to show separate listings for baseball, football, hockey, etc. Note each category must be defined in memory, as well as the tree structure. They are downloaded to the terminal by a global communication and stored in non-volatile memory.

As briefly described above, additional information can be described on "information" screens that may be associated with each program. In each information screen, in a preferred embodiment, 135 characters of description may be stored. That is three lines of 45 characters each. In this mode, in a preferred embodiment, the user is offered three options: 1) purchase, 2) record, and 3) watch. If the user selects the "purchase" option, the sequence shown in FIGS. 7 and 8 occur. That is, the user must confirm the purchase and enter the security number, if that option is activated. FIG. 9 show an "information" screen. If the "watch" option is chosen, the channel is tuned. If the user selects the "record" option, a record sequence occurs. A remote video cassette recorder may be activated via data port 140 (FIG. 3).

Of course, if the event is a pay-per-view event, a purchase sequence must occur before the program can actually be recorded or watched. For example, if the "watch" option is chosen, the subscriber terminal may tune to the channel and show it scrambled or watch a free preview for a short predetermined time. Or the user may be informed that he may purchase the event and offered a purchase sequence, or simply be informed by a barker that he must purchase the event before he can watch or record it.

The "record" option activates a record sequence. The sequence sets the terminal to activate to the proper channel at the proper time. The terminal can also set the user's VCR using known techniques or, in a less sophisticated embodiment, the user may simply be reminded to set his or her VCR timer.

Associated with the EPG is a channel listing. The channel listing shows each channel available on the system by channel number and a program identifier. The program identifier (PID) is a three or four character identifier for each channel on the subscription television system. Each channel has an assigned PID. Some PIDs are fixed in ROM in microprocessor 128 (FIG. 3); others can be downloaded into non-volatile memory (NVM) 134 (FIG. 3). In a preferred embodiment 44 channels are listed at a time. If there are more than 44 channels, a "more" command appears and allow the user to see another page of channels. FIG. 10 is an example of such a channel listing.

As cable systems have more and more channels, electronic viewing guides become more complex. If the cable system has 100 or more channels, the viewer may find maneuvering through the guide cumbersome. This is especially true for viewers who normally may spend most of their viewing time watching only a small number of the available channels. For these viewers, a favorite channel guide is available. The favorite channel guide is similar to the EPG except that it lists only a subset of the available channels. From a menu the user may define a list of his favorite channels. For example, the user might select the 10 channels he most frequently watches as his favorite channels. When the favorite channel guide is activated, only the programming appearing on those channel is shown in the grid form. Using the smaller guide is often quicker and easier for viewers. Of course, if nothing appeals to the user on those channels, the user may enter the EPG for a full listing. The favorite channel list is fully selectable by the user. Channels may be added or deleted at will. The favorite channel list can be used for other purposes as well. For example, by providing a "FAVORITE" key, the user may be allowed to sequentially tune each of his selected favorite channels to see what is playing on each own, bypassing the other (non-favorite) channels. Since on most subscription television networks there are channels that have no appeal to a given subscriber, the favorite channel feature allows the subscriber to avoid having the appearance of those channels needlessly complicate his system.

FIG. 11 shows the screen that allows a user to view and change his favorite channels. The favorite channels are shown with asterisks beside them. To add a channel to the favorite channel list, the user highlights the channel to be added by using the cursor movement keys and then activates the "SELECT" switch. To delete a channel from the favorite channel list, the user highlights a favorite channel and presses the "SELECT" switch, which deletes the channel. The user can also actuate the "CLEAR" switch and erase all favorite channels, therefore allowing the user to "start over" in selecting the favorite channels. To avoid accidental erasures the user may be asked to confirm his choice to erase all favorite channels, as shown in FIG. 12.

More recently, subscription television providers have attempted to compete more effectively with video rental operations by offering a service termed "near-video-on-demand". Consumers enjoy the video rental experience for a number of reasons. Once the tape is rented, it may be used without restriction for a period of time, typically 24 hours. During that time, the user may pause the tape, stop it and resume viewing later, rewind it to replay a portion of the program or fast-forward to skip portions uninteresting to the viewer. On the other hand, with standard pay-per-view or other television programs, the user has no control over the feature.

In a near-video-on-demand system, a feature is shown on several channels, the showing on each channel being displaced in time from each other showing by a specified time increment or multiple thereof. Thus, the system can approximate a video tape rental experience by allowing a subscriber to tune to other showings of the feature. For example, if the subscriber wants to replay the last scene, his terminal will tune the channel showing the feature one time increment prior to the showing being watched. Consider a two-hour movie. If 12 channels are allocated to the movie, then ten-minute increments can separate the various showings. Thus, if the subscriber wants to simulate a rewind function, he can tune back to the next later showing, which will be ten minutes before the current position. Similarly, if he wishes to pause, he may press a "PAUSE" button, which will allow a ten-minute pause then tune to the next later showing, which will be at the same position in the feature as where the pause was executed. To execute a fast-forward, the terminal tunes to the next earlier showing, which is ten minutes ahead of the showing previously tuned. Of course, all movement occurs in ten-minute increments; therefore, the experience is not exactly like a tape rental which allows complete freedom to pause, rewind and fast-forward. However, the feature allows a close simulation to a video tape rental without the inconvenience of renting and returning the video tape. Much like a video tape, the user has the option to buy the feature for 1-day, 2-days, or longer. During that time, he can view the feature as he wishes. The rewind "BACK" and fast-forward "FWD" buttons can be used repeatedly to move multiple increments forward or backward. Further, these buttons allow wraparound. To actuate the "BACK" button near the beginning of the movie, brings up a point near the end of the movie. To actuate the "FWD" button near the end of the movie brings up the beginning of the movie.

To conserve bandwidth, larger time increments between shows may be used. For example, with a two-hour movie, only six channels will be required if 20-minute increments are used. But 20-minute increments may be annoying to subscribers.

Referring now to FIGS. 13–17A, the near-video-on-demand service is illustrated. FIG. 13 shows a pay-per-view screen allowing the user to choose the duration for which he would like to have access to the feature. The user selects the time period and is then directed to choose a start time for the program. FIG. 14 shows three selections: 1) current showing with an indication as to how much the user will miss if he chooses this showing, 2) the next showing or 3) a future showing. If the user selects the current or next showing, he may be directed to enter his "access number" if this feature has been activated. This screen is shown in FIG. 15. If he selects a future showing, the user will be given the display shown in FIG. 16 and asked to choose a future showing. The future showings are listed and the user highlights the one of his choice and presses the "SELECT" key. A confirmation screen as shown in FIG. 17A will then appear. The screen will confirm what purchase was just made so that the subscriber can verify what he purchased.

At the chosen time, a barker will appear indicating that "Terminator 2" may be watched on Channel "XX", or optionally, the subscriber terminal can automatically tune the channel where the event is appearing.

The "PAUSE" screen is shown in FIG. 17B. The "PAUSE" screen is useful because it allows the user freedom to either restart the movie on the same showing he was watching and miss a portion of the movie or wait for the next showing. If the pause feature was only activated a minute or two, for example, to allow the viewer to take a quick phone call, the viewer may prefer to miss the minute or two of the movie rather than wait for the next showing. However, if the pause has continued longer, the viewer will likely want to wait for the next showing to begin. At that time, the tuner in the subscriber terminal will automatically tune the proper channel to allow the user to resume viewing from the point where the pause was activated. The tuning operation is under the control of control microprocessor 128 (FIG. 3). Similarly, when the "BACK" and "FWD" keys are actuated, the control microprocessor 128 will cause the tuning of the next previous or next subsequent showing.

While the above discussion centered on near-video-on-demand programs, other subject matter may also be purchased in a near-video-on-demand format, i.e., for a period of time. For example, electronic games could be downloaded from the headend and the subscriber allowed to play them for a limited period of time. The user could purchase the games for a chosen period of time. This feature is described in more detail in application Ser. No. 08/229,717, filed concurrently herewith and expressly incorporated herein by reference.

While an advantage of the instant invention is that the user may purchase pay-per-view events from the EPG, that is not the only method of purchasing the events. Whenever watching a program, the user may activate the "MENU" command. A "MAIN MENU" will appear. The "MAIN MENU" preferable has a "PAY-PER-VIEW" option. Also, the remote control may have a "PAY-PER-VIEW" key. Whenever the "PAY-PER-VIEW" option is activated (by menu or key), a pay-per-view sub-menu appears. Such a menu is shown in FIG. 18. The menu is arranged by categories of pay-per-view events. Further, the menu allows the user to review his pay-per-view selections.

If the user chooses a category, a screen similar to the one shown in FIG. 19 appears. The user may select an event by highlighting it using cursor direction keys and pressing "SELECT". The user may also use the "NEXT PAGE" and "PREVIOUS PAGE" commands to move back and forth in the menu. If the user picks a pay-per-view program, then the purchase sequence illustrated in FIGS. 7 and 8 will begin. If the feature is a near-video-on-demand event, then the purchase sequence illustrated in FIGS. 13–17A will begin.

If, on the menu of FIG. 18, the user selects "REVIEW YOUR PURCHASES", a screen similar to that shown in FIG. 20 will appear, if there are currently purchased pay-per-view events. The user may cancel a pay-per-view event that he previously purchased, but has not seen. Similarly, the viewer may return to a purchase screen such as that shown in FIG. 18 to purchase additional programs. If the viewer has not purchased pay-per-view events, then a screen to that effect will appear as shown in FIG. 21. The information on the pay-per-view events and near-video-on-demand events purchased is stored in memory in the subscriber terminal and can be accessed by microprocessor 128 on demand.

Further, while pay-per-view events have been described in the context of single features, e.g. movies, other variations are possible and fall with the scope of the instant invention. For example, a given channel, e.g. HBO, might be available for purchase for a chosen period of time, e.g. a weekend, as described in application Ser. No. 07/896,582, entitled "Method and Apparatus for Providing Periodic Subscription Television Services", filed Jun. 10, 1992 and expressly incorporated herein by reference.

While the invention has been described in detail with reference to the appended drawings, the invention is limited in scope only by the claims. Moreover, any application or patent cited herein should be construed to be incorporated by reference as to any subject matter deemed essential to the present disclosure.

We claim:

1. A subscription television system for supplying television signals to a plurality of subscribers, said subscription television system comprising:

an electronic programming guide listing a plurality of television programs by date, time and channel in a grid format, said plurality of television programs including at least one of a pay-per-view and a near-video-on-demand television program and another television program, said grid format having slots for identifying said television programs;

a first and a second transmitting means, said first transmitting means for transmitting the television signals comprising said plurality of television programs to said subscribers on a plurality of television channels, said first transmitting means also transmitting to said subscribers said electronic programming guide;

a subscriber terminal for receiving the television signals and providing the television signals to a user of said subscription television system, said subscriber terminal including:

means for displaying said electronic programming guide in said grid format and for providing a cursor to highlight said slots for identifying said television programs said cursor being activated by a remote control;

a first and a second selecting means, said first selecting means for directly selecting said television programs from said displayed programming guide by highlighting said television program slot, said first selecting means including means for directly purchasing after said user highlights said television slot said at least one of said pay-per-view or said near video-on-demand television program from said electronic programming guide by activating said highlighted television slot via said remote control; and tuning means connected to said display means to tune to said highlighted television program.

2. A subscription television system according to claim 1, wherein said subscriber terminal includes providing means for providing at least one of a pay-per-view or near-video-on-demand program to said subscriber in response to a purchase of said television program through said first selecting means.

3. A subscription television system according to claim 2, wherein said providing means includes storing means for storing an indication that said television program has been purchased.

4. A subscription television system according to claim 3, wherein said second transmitting means in said subscriber terminal transmits the contents of said storing means to a billing computer.

5. A subscription television system according to claim 4, wherein said second transmitting means in said subscriber terminal transmits the contents of said storing means over a telephone network to said billing computer.

6. A subscription television system according to claim 4, wherein said second transmitting means in said subscriber terminal transmits the contents of said storing means to said billing computer over a transmission line.

7. A subscription television system according to claim 1, wherein said first transmitting means receives electronic programming guide data from an electronics programming guide data provider and selects a portion said electronic programming guide data to transmit to said subscribers as said electronic programming guide.

8. A subscription television system according to claim 1, wherein said first transmitting means receives electronic programming guide data from an electronic programming guide data provider and supplements said data with locally generated data to form said electronic programming guide transmitted to said subscribers.

9. A subscription television system according the claim 1, wherein said subscriber terminal provides said second selecting means for selecting a subset of said channels provided by said subscription television system, said subscriber terminal includes means for displaying only a portion of said electronic programming guide corresponding to programs appearing on said subset of channels.

10. A subscription television system according to claim 1 wherein said electronic programming guide is transmitted to said subscribers by inserting data representing said electronic programming guide into the television signals.

11. A subscription television system according to claim 10 wherein said electronic programming guide is transmitted to said subscribers by inserting said data into vertical blanking intervals present in the television signals.

12. A subscription television system according to claim 10 wherein said electronic programming guide is transmitted to said subscribers by amplitude modulating said data onto at least one audio carrier associated with said television signals.

13. A subscription television system according to claim 1 where said programming guide is transmitted to said subscribers by modulating said data on an out-of-band carrier for transmission to said subscribers.

14. A subscription television system according to claim 11 where said subscriber terminal includes means for removing said data inserted in said vertical blanking intervals and storing said data in memory means in said subscriber terminal, wherein said means for displaying said electronic programming guide includes means for reading data from said memory means and displaying said data.

15. A subscription television system according to claim 12 where said subscriber terminal includes means for demodulating said data modulated on said at least one audio carrier and storing said data in memory means in said subscriber terminal, wherein said means for displaying said electronic programming guide includes means for reading data from said memory means and displaying said data.

16. A subscription television system according to claim 13 where said subscriber terminal includes means for demodulating said data modulated on said out-of-band carrier and storing said data in memory means in said subscriber terminal, wherein said means for displaying said electronic programming guide includes means for reading data from said memory means and displaying said data.

17. A subscription television system according to claim 1, where said means for transmitting said electronic programming guide to said subscribers includes means for transmitting data representing the electronic programming guide tagged to indicate the date, time and channel to which the data pertains.

18. A subscription television system according to claim 17, wherein said subscriber terminal receives said data tagged to indicate the date, time and channel to which the data pertains and loads said data into memory associated with said date, time and channel.

19. A subscription television system according to claim 1, wherein said means for transmitting said electronic programming guide to said subscribers includes means for tagging said data as short term data or long term data, depending on the difference between the current time and date and the time and date to which the data pertains, the difference in the current date and time and the date and time associated with said short term data being shorter than the difference associated with said long term data, and said means for transmitting said electronic programming guide transmitting said short term data more frequently than said long term data.

20. A subscription television system according to claim 1, wherein said grid comprises:
horizontal slots indicating the date and the time,
vertical slots indicating the television channel, wherein said television program associated with a corresponding horizontal time slot and a vertical television channel slot is indicated.

21. A subscriber terminal for receiving television signals comprising a plurality of television programs and an electronic programming guide, from a subscription television provider, at least one of said television programs being one of a pay-per-view or a near-video-on-demand television program provided only to subscribers who purchase said program, said subscriber terminal comprising:
means for displaying said electronic programming guide listing said television programs by date, time and television channel in a grid format having slots for identifying said television programs including at least one of said pay-per-view or near-video-on-demand television program;
a first and a second selecting means, said first selecting means for directly selecting said television programs from said displayed programming guide by highlighting said television program slot, said first selecting means including means for directly purchasing by after highlighting said television slot, said at least one of said pay-per-view and said near video-on-demand program from said electronic programming guide.

22. A subscriber terminal according to claim 21, further including providing means for providing one of a pay-per-view and near-video-on-demand program to said user in response to said user purchasing said program through said first selecting means.

23. A subscriber terminal according to claim 22, wherein said providing means includes storing means for storing an indication that said program has been purchased through said first selecting means.

24. A subscriber terminal according to claim 23, wherein said subscriber terminal includes transmitting means for transmitting the contents of said storing means to a billing computer associated with the subscription television provider.

25. A subscriber terminal according to claim 24, wherein said transmitting means in said subscriber terminal transmits the contents of said storing means over a telephone network.

26. A subscriber terminal according to claim 24, wherein said transmitting means in said subscriber terminal transmits the contents of said storing means to said billing computer through a transmission line.

27. A subscriber terminal according to claim 21 wherein said second selecting means selects a subset of the channels provided by said subscription television system, said subscriber terminal including means for displaying a only a portion of said electronic programming guide corresponding to programs appearing on said subset of channels.

28. A subscriber terminal according to claim 21 wherein said electronic programming guide is transmitted to said subscribers by inserting data representing said electronic programming guide into vertical blanking intervals present in said television signals, said subscriber terminal including means for removing said data inserted in said vertical blanking intervals and storing said data in memory means in said subscriber terminal, wherein said means for displaying said electronic programming guide includes means for reading data from said memory means and displaying said data.

29. A subscription television system according to claim 21 wherein data representing said electronic programming guide is transmitted to said subscribers by amplitude modulating said data onto at least one audio carrier associated with said television signals, said subscriber terminal further including means for demodulating said data modulated on said at least one audio carrier and storing said data in memory means in said subscriber terminal, wherein said means for displaying said electronic programming guide includes means for reading data from said memory means and displaying said data.

30. A subscription television system according to claim 21 where said programming guide is transmitted to said subscribers by modulating data representing said electronic programming guide on an out-of-band carrier for transmission to said subscribers, said subscriber terminal further including means for demodulating said data modulated on said out-of-band carrier and storing said data in memory means in said subscriber terminal, wherein said means for displaying said electronic programming guide includes means for reading data from said memory means and displaying said data.

31. A subscriber terminal according to claim 21, where data representing said electronic programming guide is sequentially transmitted to said subscribers and includes data tags to indicate the date, time and channel to which the data pertains, and said subscriber terminal receiving said data tags to indicate the date, time and channel to which the data pertains and loading said data into memory within said subscriber terminal associated with said date, time and channel.

32. The method of selecting one of a pay-per-view and near-video-on-demand program in a subscription television system, including the following steps:

displaying an electronic programming guide transmitted by a subscription television provider wherein said programming guide list television programs by date, time, and television channel in a grid format, said grid format having slots for identifying said television programs including at least one of a pay-per-view or near-video-on-demand television program;

using a user interface to select and purchase directly said pay-per-view or said near video-on-demand program from said electronic programming guide.

33. A method for supplying television signals to a plurality of subscribers of a subscription television system and selecting a television program comprising the steps of:

transmitting television signals to said subscribers on a plurality of television channels wherein the television signals comprises a plurality of television programs and further transmitting to said subscribers an electronic programming guide;

receiving the television signals by a subscriber terminal and providing the television signals to a user of said subscription television system;

displaying said electronic programming guide in a grid format wherein said grid format has slots for identifying said television programs and displaying a cursor wherein said cursor moves about said programming guide and highlights said television program slots, said cursor being activated by a remote control;

listing said plurality of television programs by date, time and channel in said grid format on said electronic programming guide, said plurality of television programs including at least one of a pay-per-view and a near-video-on-demand television program and another television program;

selecting said television programs directly from said displayed programming guide by highlighting said television program slot; and purchasing, by activating said highlighted slot via said remote control after said user highlights said television program slot, said at least one of said pay-per-view and said near video-on-demand program directly from said electronic programming guide.

34. The method according to claim 33 further comprising the step of:

providing at least one of said pay-per-view or said near-video-on-demand television program to said subscriber in response to a purchase of said television program.

35. The method according to claim 34 further comprising the step of:

storing an indication that said television program has been purchased.

36. The method according to claim 35 further comprising the step of:

transmitting the contents stored to a billing computer.

37. The method according to claim 36 further comprising the step of:

transmitting the contents stored over a telephone network to said billing computer.

38. The method according to claim 36 further comprising the step of:

transmitting the contents stored to said billing computer over a transmission line.

39. The method according to claim 33 wherein said transmitting television signals and said electronic programming guide step further comprises the steps of:

receiving electronic programming guide data from an electronic programming guide data provider; and selecting a portion of said electronic programming guide data to transmit to said subscribers as said electronic programming guide.

40. The method according to claim 33, wherein said transmitting television signals and said electronic programming guide step further comprises the steps of:

receiving electronic programming guide data from an electronic programming guide data provider; and supplementing said data with locally generated data to form said electronic programming guide transmitted to subscribers.

41. The method according to claim 33 further comprising the steps of selecting a subset of said channels provided by said subscription television system; and displaying only a portion of said electronic programming guide corresponding to programs appearing on said subset of channels.

42. The method according to claim 33 wherein said transmitting said electronic programming guide step further comprises the step of:

inserting data representing said electronic programming guide into the television signals.

43. The method according to claim 42 wherein said transmitting said electronic programming guide step further comprises the step of:

inserting said data into vertical intervals present in the television signals.

44. The method according to claim 42 wherein said transmitting said electronic programming guide step further comprises the step of:

amplitude modulating said data on at least on audio carrier associated with the television signals.

45. The method according to claim 33 wherein said transmitting said electronic programming guide step further comprises the step of:

modulating said data on an out-of-band carrier for transmission to said subscribers.

46. The method according to claim 43 further comprising the steps of:

removing said data inserted in said vertical blanking intervals;

storing said data in memory in said subscriber terminal, wherein said displaying said electronic programming guide step further comprises the steps of:

reading data from said memory; and displaying said data.

47. The method according to claim 44 further comprising the steps of:

demodulating said data modulated on said at least one audio carrier;

storing said data in memory of said subscriber terminal, wherein said displaying said electronic programming guide step further comprises the steps of:

reading data from said memory; and displaying said data.

48. The method according to claim 45 further comprises the steps of:

demodulating said data modulated on said out-of-band carrier;

storing said data in memory of said subscriber terminal, wherein said displaying said electronic programming guide step further comprises the steps of:

reading data from said memory; and displaying said data.

* * * * *